United States Patent [19]

Manning

[11] Patent Number: 5,510,310
[45] Date of Patent: Apr. 23, 1996

[54] FLOOR DRY MATERIAL AND METHOD OF MANUFACTURE

[75] Inventor: Harold J. Manning, Pasco, Wash.

[73] Assignee: Cerad Industries, Inc., Oklahoma City, Okla.

[21] Appl. No.: 142,680

[22] Filed: Oct. 26, 1993

Related U.S. Application Data

[63] Continuation-in-part of Ser. No. 131,492, Oct. 4, 1993, Pat. No. 5,372,314.

[51] Int. Cl.⁶ .................................................. B01J 20/10
[52] U.S. Cl. ........................ 502/412; 502/401; 502/404; 241/21; 106/720
[58] Field of Search ................................. 502/401, 404, 502/412

[56] References Cited

U.S. PATENT DOCUMENTS

| | | | |
|---|---|---|---|
| 3,271,161 | 9/1966 | Eshleman | 99/4 |
| 4,187,141 | 2/1980 | Ahrel | 162/23 |
| 4,279,895 | 7/1981 | Carle | 424/127 |
| 4,799,961 | 1/1989 | Friberg | 106/93 |
| 5,028,299 | 7/1991 | Guidat et al. | 162/24 |
| 5,087,400 | 2/1992 | Theuveny | 264/115 |

FOREIGN PATENT DOCUMENTS 55-44355  3/1980  Japan .............................. C02F 11/00

OTHER PUBLICATIONS

National Lime Association, *Chemical Lime Facts*, Sixth Edition, 1992.

*Primary Examiner*—Sharon Gibson
*Attorney, Agent, or Firm*—Head Johnson & Kachigian

[57] ABSTRACT

A floor dry material and method of manufacturing same in which waste cellulosic fibrous material, such as waste paper, is finely shredded after which any metal component is removed and the shredded material is then thoroughly mixed with a biodegradable surfactant, calcium oxide, and water until a temperature about 140° F. to 150° F. is achieved after which a natural citric-based solvent degreaser and a material selected from the group comprising silica diatomite plankton and non-swelling clay are added to obtain a finished floor dry material.

18 Claims, 1 Drawing Sheet

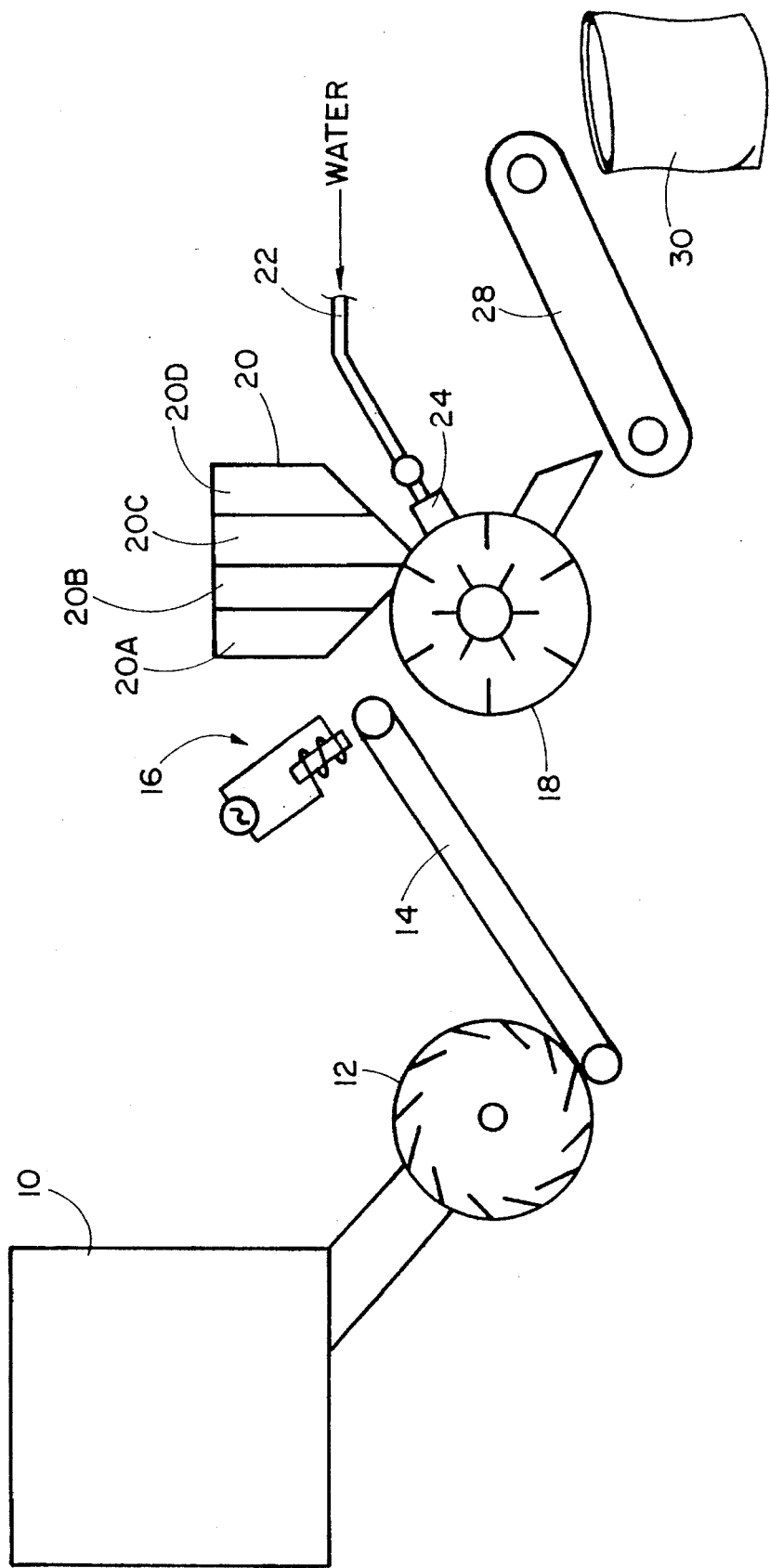

FLOOR DRY MATERIAL AND METHOD OF MANUFACTURE

This is a continuation-in-part of application Ser. No. 08/131,492 filed on Oct. 4, 1993, now U.S. Pat. No. 5,372,314.

BACKGROUND OF THE INVENTION

Floor dry material is used wherever oil, petroleum products, or other chemical substances are used and spilled. Historically floor dry materials have consisted of sawdust mixed with coal oil, mineral spirits, or other hydrocarbons capable of containing and/or absorbing to some extent the spilled substance. Commonly used in industry today as floor dry material, however, are products containing certain non-swelling clays or silica diatomite plankton (diatomaceous earth). These clay and diatomaceous earth floor dry products are typically in the form of pellets or granules which have been flashed dried in intense heat to create an outer pitrofied ceramic shell. The spilled oil or other substance attaches to the pitrofied shell of the clay or diatomaceous earth product thereby making removal of the spilled substance easier to accomplish. The pellets or granules can be scooped or shoveled up and deposited in containers for later disposal.

These clay and diatomaceous earth floor dry products, however, leave much to be desired. First, the "absorbability" (or, more appropriately, "attachability") of the products is dependent upon the level of pitrification of the granules or pellets. Considering the harsh, and somewhat uncontrollable, nature of the flash drying process, uniform results in pitrification (and therefore uniform absorbability) is almost impossible to obtain. Additionally, the clay or diatomaceous earth floor dry material does nothing to render spilled oil or petroleum product any more environmentally disposable than would be the oil itself. Ease in collection is the only real advantage of the pitrofied floor dry products. The problem of hydrocarbon disposal, made difficult by environmental regulations attendant to the disposal of hazardous substances, is still present. Moreover, as many floor dry materials are utilized in areas such as workshops and manufacturing facilities, the day or diatomaceous earth floor dry materials do nothing to eradicate the noxious odor associated with spilled petroleum substances and the like.

A more general problem regarding the disposability of waste products exists throughout this country and abroad in connection with the disposal of waste paper and waste cardboard. If placed in large quantities in landfills, waste paper degrades very, very slowly, particularly if disposed of in normal compacted form. The expense of shredding waste paper prior to disposal in a landfill has been too high to make it economically feasible to require all waste paper and waste cardboard to be shredded before disposal; and even if shredded, the shredded material becomes highly compacted, and, if covered with earth, it biodegrades very slowly.

For these reasons, there exists a need for an improved floor dry material that can be made employing a product, which within itself constitutes a waste disposal problem (waste paper), that improves not only the collectability but also the disposability of spilled petroleum substances, that has an increased absorbability as compared to clay or diatomaceous earth floor dry materials, that is fire retardant, and that aromatically neutralizes the odors associated with spilled petroleum substances. Further, there is a need for a floor dry material amenable to processes that reduce the hydrocarbons present in petroleum substances to a biodegradable product capable of easy and environmentally safe disposal.

SUMMARY OF THE INVENTION

This invention provides a highly effective floor dry material, and method of making same, employing readily available waste components and other inexpensive and readily available materials. The floor dry material is manufactured employing the steps as follows:

(1) Waste cellulosic fibrous material, such as waste paper, cardboard, or so forth, is finely shredded to obtain a shredded fiber. In a preferred practice of the invention, the material, such as waste paper, is shredded to a size wherein the maximum dimension of the shredded components is about 500 microns.

(2) The finely shredded cellulosic fibrous material is passed through a separator wherein any metal components are removed. The metal extraction step is accomplished utilizing a magnetic separator—a process well known in the industry.

(3) The demetalled shredded fiber of step (2) is then mixed with a biodegradable surfactant (such as an agricultural soap), calcium oxide, and water until a temperature of 140° F. to 150° F. is achieved to obtain a first mixture that is in the form of a slurry.

(4) Added to the first mixture slurry of step (3) is a natural citric-based solvent degreaser to obtain a second mixture slurry.

(5) To the second mixture slurry of step (4) is then added a non-swelling clay or diatomaceous earth in an amount sufficient to fluff and dry the second mixture slurry to obtain a finished floor dry material.

The finished floor dry material of step (5), after its use, is amenable to treatment with biological microbes, known in the industry, which function to reduce any hydrocarbons absorbed by the finished floor dry material to proteins, thus increasing the disposability of the Boor dry material.

Diatomaceous silica has previously been used for forming insecticidal compositions such as revealed in U.S. Pat. No. 4,279,895 issued to Arthur Carle entitled "Insecticidal Natural Bait Composition and Method of Using Same". Further, the use of diatomaceous earth in poultry feed is disclosed in U.S. Pat. No. 3,271,161 issued Sep. 6, 1966 to John C. Eshleman entitled "Poultry Feed Containing About 1% Diatomaceous Earth". Diatomaceous earth has also been used by this inventor in Ms method of treating waste cellulosic fiber sludge to form a useable, environmentally safe filler material, for which copending application for patent has been made as Ser. No. 08/087,193, filed Jul. 2, 1993, in his method of manufacturing animal bedding, which was the subject of a copending U.S. patent application filed Oct. 4, 1993 as Ser. No. 08/131,492, now U.S. Pat. No. 5,372,314, and in his application for patent Ser. No, 08/142,685, entitled Soil Supplement and Method of Manufacture, filed on the same day as the instant application.

A better understanding of the invention will be obtained from the following description, taken in conjunction with the attached drawing.

BRIEF DESCRIPTION OF THE DRAWINGS

The drawing illustrates diagrammatically the sequence of steps employed in the method of this invention for manufacturing floor dry material.

DETAILED DESCRIPTION OF THE PREFERRED EMBODIMENT

Referring to the drawing, the element number 10 indicates a source of waste cellulosic fibrous material that can be in the form of waste paper or waste cardboard, or any similar inexpensive source of cellulosic fibrous material. A serious problem in the world today is the disposal of waste paper and waste cardboard. Some of such waste materials are recycled for the use in making recycled paper. However, such processes are not highly economical, and today only a relatively small percent of waste paper or waste cardboard is processed in a manner to be recycled for making new paper or new cardboard. The composition and method of this invention make good use of such readily available waste paper and waste cardboard.

The waste fibrous material from source 10 is conveyed to a shredder 12 wherein the material is finely shredded. Industrial waste paper shredders are commercially available. In the preferred practice of the invention, the waste fibrous material should be shredded so that the particle size of the shredded material on the average has a maximum dimension of about 500 microns.

The shredded material is fed to a conveyor 14, or other similar device, where it is carried to a magnetic separator station, indicated generally by the numeral 16, wherein any metal component of the finely shredded cellulosic fibrous material is removed. Should, however, the shredded fibrous material be assuredly devoid of any metal component, the shredded material need not be carried through the magnetic separator. The demetalled shredded fibrous material is deposited from conveyor 14 into a reactor 18. In reactor 18 a biodegradable surfactant, calcium oxide and water are added to the demetalled shredded fibrous material.

The biodegradable surfactant, such as those sold under the trademark BR-EM 16 or BR-EM 17 manufactured by Biosphere or WEX manufactured by Conklin Co., is added to reactor 18 from a first portion 20A of a feeder 20. In the preferred composition and method, the ratio by dry weight of surfactant to demetalled shredded fibrous material is about 0.016 to 1. The calcium oxide is added to reactor 18 from a second portion 20B of feeder 20. In the preferred composition and method, the ratio by weight of calcium oxide to demetalled shredded fibrous material is about 0.168 to 1. Water from a source 22 is fed into reactor 18 in conjunction with a moisture control apparatus 24. In the preferred composition and method, the ratio by weight of water to demetalled shredded fibrous material is about 2 to 1. The surfactant, calcium oxide, water and demetalled shredded fibrous material are thoroughly mixed within reactor 18 until a temperature of about 140° F. to 150° F. is achieved. The reaction of the surfactant, calcium oxide, water and demetalled shredded fibrous material is exothermic so that the desired temperature can be achieved without the addition of heat to the reaction.

After the reaction of the surfactant, calcium oxide, water and demetalled shredded fibrous material has been carried out sufficiently to obtain the desired temperature and to obtain a first mixture slurry, there is added thereto in reactor 18 from a third portion 20C of feeder 20 a natural citric-based solvent degreaser, such as sold under the trademark CITROLINE manufactured by Share Corp, to obtain a second mixture slurry. In the preferred composition and method, the ratio by weight of degreaser to demetalled shredded fibrous material is about 0.01 to 1.

To the second mixture slurry in reactor 18 is then added and thoroughly mixed from a fourth portion 20D of feeder 20 a non-swelling clay or diatomaceous earth in an amount sufficient to dry and fluff the second mixture slurry to obtain a finished floor dry material. In the preferred composition and method, the ratio by weight of clay or diatomaceous earth to demetalled shredded fibrous material is about 1 to 1 and the clay or diatomaceous earth is of an approximate 350 mm grind.

The finished floor dry material is then passed from reactor 18 to a conveyor 28 where it can be passed on for storage or packaging 30.

It should be stated that it is possible to combine the biodegradable surfactant with the citric-based solvent degreaser to obtain a natural citric-based biodegradable surfactant prior to the mixing of the surfactant, calcium oxide and water with the demetalled shredded fibrous material.

After use, if desired, biological microbes, known in the art, can be added to the used finished floor dry material. The digestive effect of such microbes on any hydrocarbons absorbed by the finished floor dry material results in a reduction 40 proteins of such hydrocarbons.

EXAMPLE

This example is set forth for purposes of illustrating the above-described composition and method of manufacture. Starting with 250 lbs. of waste cellulosic fibrous material obtained from source 10, the material is conveyed to shredder 12 wherein the material is finely shredded to an average maximum dimension of about 500 microns. The shredded material is then fed to conveyor 14 where it is carried to the magnetic separator station 16 wherein any metal component of the shredded material is removed. The demetalled shredded material is deposited from conveyor 14 into reactor 18. In reactor 18 from first portion 20A of feeder 20 is added 4 lbs. of a suitable biodegradable surfactant. 42 lbs. of calcium oxide is also added to reactor 18 from second portion 20B of feeder 20, and 60 gallons water from source 22 is fed into reactor 18 through the moisture control apparatus 24. The surfactant, calcium oxide, water and demetalled shredded material are thoroughly mixed within reactor 18 until a temperature of about 140° F. to 150° F. is achieved. After the desired temperature is achieved and a first mixture slurry is obtained, there is added thereto in reactor 18 from third portion 20C of feeder 20 2.5 lbs. of a natural citric-based solvent degreaser to obtain a second mixture slurry. To the second mixture slurry in reactor 18 from fourth portion 20D of feeder 20 is then added and thoroughly mixed 250 lbs. of a non-swelling clay or diatomaceous earth. The second mixture slurry and clay or diatomaceous earth are mixed for a time sufficient to dry and fluff the second mixture slurry to obtain a finished floor dry material. The finished floor dry material is then passed from reactor 18 to a conveyor 28 where it is passed on for storage or packaging 30.

The floor dry material thus described is economical to manufacture. Further, the microbially activated floor dry material, after being used and after having absorbed quantities of petroleum substances, can be easily disposed of since all hydrocarbons present are broken down to simple protein structures. Moreover, the used floor dry material can be placed directly upon land where it functions to improve soil texture achieved by the biodegradable cellulosic material and diatomaceous earth. Further, the calcium oxide portion of the floor dry material is considered beneficial to the soil. If plankton or diatomaceous earth from fresh water sources are used, no salt or any other salinity results in the finished material. Still further, the floor dry material is fire retardant, decreasing the chance of bodily injury or property damage caused by flash fires. Finally, when in use, the floor dry material aromatically neutralizes the unpleasant scent of spilled petrochemical products.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularly, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method of manufacturing floor dry material comprising the following steps:
   (1) shredding waste cellulosic fibrous material, to obtain a shredded fiber;
   (2) mixing the shredded fiber of step (1) with a biodegradable surfactant, calcium oxide, and water until a temperature of about 140° F. to 150° F. is achieved to obtain a first mixture slurry;
   (3) mixing a natural citric-based solvent degreaser with the first mixture slurry of step (2) to obtain a second mixture slurry; and
   (4) mixing with the second mixture slurry of step (3) a material selected from the group consisting of silica diatomite plankton and non-swelling clay to obtain a finished floor dry material.

2. A method of manufacturing floor dry material comprising the following steps:
   (1) shredding waste cellulosic fibrous material, to obtain a shredded fiber;
   (2) mixing the shredded fiber of step (1) with a natural citric-based biodegradable surfactant, calcium oxide, and water until a temperature of about 140° F. to 150° F. is achieved to obtain a mixture slurry; and
   (3) mixing with the mixture slurry of step (2) a material selected from the group consisting of silica diatomite plankton and non-swelling clay to obtain a finished floor dry material.

3. A method of manufacturing floor dry material according to claims 1 or 2, further comprising: passing the shredded fiber of step (1) through a metal separator wherein any metal component in the shredded fiber is removed.

4. A method of manufacturing floor dry material according to claims 1 or 2, wherein the waste cellulosic fibrous material of step (1) is shredded to a size of about 500 microns.

5. A method of manufacturing floor dry material according to claims 1 or 2, wherein the ratio by weight of the biodegradable surfactant to the shredded fiber is about 0.016 to 1.

6. A method of manufacturing floor dry material according to claims 1 or 2, wherein the ratio by weight of the calcium oxide to the shredded fiber is about 0.168 to 1.

7. A method of manufacturing floor dry material according to claims 1 or 2, wherein the ratio by weight of the water to the shredded fiber is about 2 to 1.

8. A method of manufacturing floor dry material according to claims 1 or 2, wherein the ratio by weight of the solvent degreaser to the shredded fiber is about 0.01 to 1.

9. A method of manufacturing floor dry material according to claims 1 or 2, wherein the ratio by weight of the material selected from the group comprising silica diatomite plankton and non-swelling clay to the shredded fiber is about 1 to 1.

10. A method of manufacturing floor dry material comprising the following steps:
    (1) shredding waste cellulosic fibrous material, to a size of about 500 microns to obtain a shredded fiber;
    (2) passing the shredded fiber from step (1) through a metal separator wherein any metal component in the shredded fiber is removed to obtain a demetalled shredded fiber;
    (3) mixing the demetalled shredded fiber of step (2) with a biodegradable surfactant, calcium oxide, and water at a ratio by weight of the surfactant to the demetalled shredded fiber of about 0.016 to 1, of the calcium oxide to the demetalled shredded fiber of about 0.168 to 1, and of the water to the demetalled shredded fiber of about 2 to 1, until a temperature of about 140° F. to 150° F. is achieved to obtain a first mixture slurry;
    (4) mixing a natural citric-based solvent degreaser with the first mixture slurry of step (3) at a ratio by weight of the solvent degreaser to the demetalled shredded fiber of about 0.01 to 1 to obtain a second mixture slurry; and
    (5) mixing with the second mixture slurry of step (4) a material selected from the group consisting of silica diatomite plankton and non-swelling clay at a ratio by weight of the material to the demetalled shredded fiber of about 1 to 1 to obtain a finished floor dry material.

11. A floor dry material, comprising:
    (a) a waste cellulosic fibrous material;
    (b) a biodegradable surfactant;
    (c) calcium oxide;
    (d) water;
    (e) a natural citric-based solvent degreaser; and
    (f) a material selected from the group consisting of silica diatomite plankton and non-swelling clay.

12. A floor dry material according to claim 11, wherein the fibrous material is shredded to a size of about 500 microns.

13. A floor dry material according to claim 11, wherein the ratio by weight of the surfactant to the fibrous material is about 0.016 to 1.

14. A floor dry material according to claim 11, wherein the ratio by weight of the calcium oxide to the fibrous material is about 0.168 to 1.

15. A floor dry material according to claim 11, wherein the ratio by weight of the water to the fibrous material is about 2 to 1.

16. A floor dry material according to claim 11, wherein the ratio by weight of the solvent degreaser to the fibrous material is about 0.01 to 1.

17. A floor dry material according to claim 11, wherein the ratio by weight of the material selected from the group comprising silica diatomite plankton and non-swelling clay to the fibrous material is about 1 to 1.

18. A floor dry material, comprising:
(a) a waste cellulosic fibrous material, shredded to a size of about 500 microns;
(b) a biodegradable surfactant at a ratio by weight of the surfactant to the fibrous material of about 0.016 to 1;
(c) calcium oxide at a ratio by weight of the calcium oxide to the fibrous material of about 0.168 to 1;
(d) water at a ratio by weight of the water to the fibrous material of about 2 to 1;
(e) a natural citric-based solvent degreaser at a ratio by weight of the solvent degreaser to the fibrous material of about 0.01 to 1; and
(f) a material selected from the group consisting of silica diatomite plankton and non-swelling clay at a ratio by weight of the material to the fibrous material of about 1 to 1.

* * * * *